United States Patent
Hsieh et al.

(10) Patent No.: US 9,651,311 B2
(45) Date of Patent: May 16, 2017

(54) THERMAL EXCHANGE FOOD PROCESSING DEVICE AND METHOD OF PRODUCING SAME

(71) Applicant: GIXIA GROUP CO., Jhubei, Hsinchu County (TW)

(72) Inventors: Jung-Ya Hsieh, Jhubei (TW); Yung-Fu Lin, Jhubei (TW)

(73) Assignee: GIXIA GROUP Co., Hsinchu County (TW)

( * ) Notice: Subject to any disclaimer, the term of this patent is extended or adjusted under 35 U.S.C. 154(b) by 240 days.

(21) Appl. No.: 14/099,116

(22) Filed: Dec. 6, 2013

(65) Prior Publication Data

US 2014/0157605 A1    Jun. 12, 2014

(30) Foreign Application Priority Data

Dec. 7, 2012   (TW) .............................. 101146134 A
Nov. 8, 2013   (TW) .............................. 102140732 A

(51) Int. Cl.

| | |
|---|---|
| *F28D 15/02* | (2006.01) |
| *B26B 27/00* | (2006.01) |
| *B23P 15/26* | (2006.01) |
| *A47G 21/04* | (2006.01) |
| *A47J 36/24* | (2006.01) |
| *A47J 39/02* | (2006.01) |
| *A47G 23/03* | (2006.01) |
| *B26B 9/00* | (2006.01) |
| *F28D 21/00* | (2006.01) |

(52) U.S. Cl.

CPC ......... *F28D 15/02* (2013.01); *A47G 23/0313* (2013.01); *A47J 36/24* (2013.01); *A47J 39/02* (2013.01); *B26B 9/00* (2013.01); *F28D 2021/0042* (2013.01); *Y10T 29/49353* (2015.01)

(58) Field of Classification Search

CPC .......... A47J 36/24; A47J 39/02; A47J 43/282; A47G 23/0313; B26B 9/00; Y10T 29/49352; F28D 15/02; F28D 2021/0042
USPC .......... 30/165, 324; 425/277, 279, 221, 276, 425/187; 165/104.21; 29/890.032
See application file for complete search history.

(56) References Cited

U.S. PATENT DOCUMENTS

| | | | | |
|---|---|---|---|---|
| 2,171,606 A | * | 9/1939 | Shultz ................... | A47J 43/282 425/277 |
| 2,560,900 A | * | 7/1951 | Shultz ..................... | A21C 5/00 425/277 |

(Continued)

*Primary Examiner* — Ghassem Alie

(57) ABSTRACT

A thermal exchange food processing device includes a thermal conductive body, a thermal insulation layer and a phase change material. The thermal conductive body has an acting region and an inner thermal conductive region corresponding to, and in thermal connection with, the acting region. The thermal insulation layer has a lower thermal conductivity coefficient than the thermal conductive body and encapsulates, at least in part, the thermal conductive body, so that the acting region of the thermal conductive body is exposed while the remaining regions of the thermal conductive body other than the acting region are thermally insulated from ambient temperature. The thermal conductive body, alone or together with the thermal insulation layer, defines an accommodation space, and the inner thermal conductive region is situated to face the accommodation space. The phase change material is within the accommodation space.

12 Claims, 15 Drawing Sheets

(56) References Cited

U.S. PATENT DOCUMENTS

| | | | | |
|---|---|---|---|---|
| 3,093,135 A * | 6/1963 | Hirschhorn | ............ | A61B 18/02 30/140 |
| 5,206,791 A * | 4/1993 | Novotny | ............... | H01L 23/427 165/185 |
| 5,837,296 A * | 11/1998 | Virkler | .................. | A47J 43/282 425/277 |
| 6,416,309 B1 * | 7/2002 | Michlitsch | ............ | A47J 43/282 425/187 |
| 6,846,171 B2 * | 1/2005 | Herbert | ................. | A47J 43/282 425/277 |
| 8,814,554 B2 * | 8/2014 | LeGreve | ................. | A23P 1/105 425/187 |

* cited by examiner

THERMAL EXCHANGE FOOD PROCESSING DEVICE AND METHOD OF PRODUCING SAME

FIELD OF THE INVENTION

The present invention relates to a thermal exchange food processing device and a method of producing the same.

BACKGROUND OF THE INVENTION

During hot summer days, a refreshing cool drink quenches thirst and could even help one improve one's work efficiency. However, any cool drink will inevitably absorb heat from the environment, making the cool drink warm. One must either finish the drink in a hurry and thus unable to fully enjoy the moment, or cool the drink down again using a refrigeration device, an unsatisfactory solution which takes time to complete. A simple solution is to add ice cubes into the drink directly. Although the ice cubes can cool the drink quickly, the melting ice cubes will also dilute the drink and make it lose its original taste. Moreover, when taking the drink to travel from one place to another, the cool drink can only last for a short time even if the drink is contained in an insulated vessel.

Conversely, heating food like steak can be done using the common stove or heated igneous rocks. The steak is put on a flat igneous rock and served directly, thus allowing the one could decide for himself/herself the degree of cooking needed based on one's personal preference. As the rock must have high thermal resistance and thermal capacity, from the preference is to use lava rocks from volcanoes. This introduces two problems: first is the need to process any lava rocks into surfaces suitable for serving foods, and the second is the wear and tear of the processed rock surface from repeated use. The challenge is to make use of technology to replace the heavy and rare stones to lower cost.

Many people like spreading a layer of butter on a piece of bread such as a toast or croissant for breakfast or dessert. Although seemingly simple to do, it is not always easy to spread butter because butter is usually kept in a cold state in a refrigerator. Using table knife or other kitchen utensil to carve butter entails large amount of force. Consequently, some people heat the table knife or utensils in hot water in an attempt to use stored heat to help melt the cold butter, thus enabling a smooth carving and spreading motion.

However, the above methods require extra effort and preparation. When spreading butter on bread, one may not have access to hot water. Having hot water near dining surfaces may result in spilling water. In addition, the utensils in question are usually small in size with limited heat storage capacity, making repeated spreading action over multiple breads impractical. If the utensil is overheated in any way to store more heat, the overheated utensil handle may cause injury to one's extremities. Also, if the utensil is overheated, the butter may become over melted thus defeating the purpose.

Some practitioners propose filling the handle of certain utensils with mercury. One holds onto a metallic handle to first transmit heat into the mercury, then through the conduction and convection of mercury during the rigorous shaking, the temperature in the front end of the utensil will increase to facilitate the cutting action. However, as this type of tool has a low thermal capacity, the user must hold and repeatedly shake the tool in order for it to work. Not only is mercury expensive, it is also highly poisonous. Any accidental leak, even minute amounts onto foods will lead to mercury poisoning.

One faces similar challenge when scooping frozen ice cream. Some practitioners propose electrically charging the ice cream scoop, but this method is inconvenient. Electric ice cream scoop melts the ice cream, resulting in soupy texture that is not desired. Electrical cords or batteries from batteries are cumbersome as well.

To sum up, insulated food and beverage containers, bottles, cups, and jars in the market today such as the Thermos, use insulation to reduce heat transfer between the inner and outer shells of the same vessel, so as to extend the current temperature of the foods and slow down the thermal balancing with the ambient environment. However, it doesn't solve the problem essentially as it can't heat or cool the food. Another way is electric heating. For example, a cooling chip is added to create a bi-directional temperature difference for heating/cooling by using the current input. However, the temperature difference provided is quite limited for smooth food processing. On the other hand, food processing will rely on power supply, lacking the convenience of portability.

The present invention proposes a thermal exchange food processing device accommodating phase change material and method of producing the same. By using the high latent heat feature of the phase change material, it could absorb/release large amounts of latent heat during the phase change process, so as to provide the thermal exchange for food processing. Take common salty water as an example. When the salt content reaches saturated status, its melting point could be reduced to −21° C. When the ice in solid phase is transformed into water, the melting latent heat is 333 kJ/kg, and the heat required is enough to cool the water in an equivalent mass of 80 to 0. It also indicates that when the ice made from salty water is melted from solid to liquid phase, it could absorb and store large amounts of heat for cooling the foodstuff.

On the contrary, let us take paraffin (melting point at 60° C.) as an example, whose specific heat is about 2.5 kJ/kg for each degree within the ambient range. The solidification of liquid phase requires latent heat of about 220 kJ/kg. That is, a kilogram of paraffin heated to 150° C. could heat 10 ounces of steak (about 284 g) from ambient to more than 60° C. and keep the temperature for some time by cooling it to 60° C. and solidifying it. If the invention could make good use of the latent heat of the material, it could be applied not only to process taken-out food, cool and frozen drinks in real time, but also to process hot food items like steak. It could be a convenient processing device on one hand and could increase the cooking enjoyment on the other.

This case proposes a thermal exchange food processing device and method of producing the same, expecting to effectively achieve the heating/cooling purpose without power supply. In this way, it will not only avoid the increase of manufacturing cost brought about by a complex structure, but also keep the compact shape. Moreover, it decreases the temperature restriction and allows people to enjoy food in broader environment conditions, so as to bring more fun and increase life quality.

SUMMARY OF THE INVENTION

The purpose of the present invention is to provide a thermal exchange food processing device and method of producing same, which eliminates the restriction of power supply and provides mobility and convenience in use.

Another purpose of the invention is to provide a thermal exchange food processing device and method of producing same, which provides inner thermal conductive region for good thermal exchange, so as to increase food processing effect.

Another purpose of the invention is to provide a thermal exchange food processing device and method of producing same, which keeps heating/cooling the processed food without consuming extra power, so as to increase the food quality.

It is still another purpose of the invention to provide a thermal exchange food processing device and method of producing same, which processes and provides a cool drink or iced drink, so as to maintain the drinking taste and freshness.

To achieve the above purposes, this case provides a method of producing a thermal exchange food processing device, consisting of steps: a) forming a thermal conductive body, the thermal conductive body consisting of an acting region and at least one inner thermal conductive region disposed corresponding to and in thermal connection to the acting region, wherein the thermal conductive body defines a hollow accommodation space having an opening; and b) filling the accommodation space with a phase change material, sealing the opening and forming a thermal insulation layer to encapsulate at least in part the thermal conductive body, so that the acting region of the thermal conductive body is exposed while the remaining regions of the thermal conductive body other than the acting region are thermally insulated from ambient.

The above method is followed to produce a thermal exchange food processing device for processing at least one target foodstuff. The thermal food processing device is comprised of: a thermal conductive body formed with a thermal exchange acting wall comprised of at least an acting region adapted for contacting with and exchanging heat with the target food item and at least one inner thermal conductive region disposed corresponding to and in thermal connection to the acting region; a thermal insulation layer having a lower thermal conductivity coefficient compared with the thermal conductive body and encapsulating at least in part the thermal conductive body, so that the acting region of the thermal conductive body is exposed while the remaining regions of the thermal conductive body other than the acting region are thermally insulated from ambient, wherein the thermal conductive body alone or together with the thermal insulation layer defines an accommodation space and the inner thermal conductive region is disposed to face the accommodation space; and a phase change material disposed within the accommodation space and in thermal connection to the inner thermal conductive region.

The thermal exchange food processing device and method of producing same in this case, with the phase change material, acting region and inner thermal conductive region, achieves the heating/cooling effect by means of latent heat without a power supply. By doing so, it provides mobility and convenience for using the thermal exchange food processing device, keeping the original flavor of the food item and maintaining its fresh taste.

BRIEF DESCRIPTION OF THE DRAWINGS

The foregoing and other features and advantages of illustrated embodiments of the present invention will be more readily apparent from the following detailed description, which proceeds with reference to the accompanying drawings.

DETAILED DESCRIPTION OF THE ILLUSTRATED EMBODIMENTS

The above statements related to the invention, other technical contents, features and benefits will be clearly presented in the detailed illustration for the preferred embodiments as shown in the diagrams. Besides, the same assembly in these embodiments will be represented by similar symbols.

Figure 1:
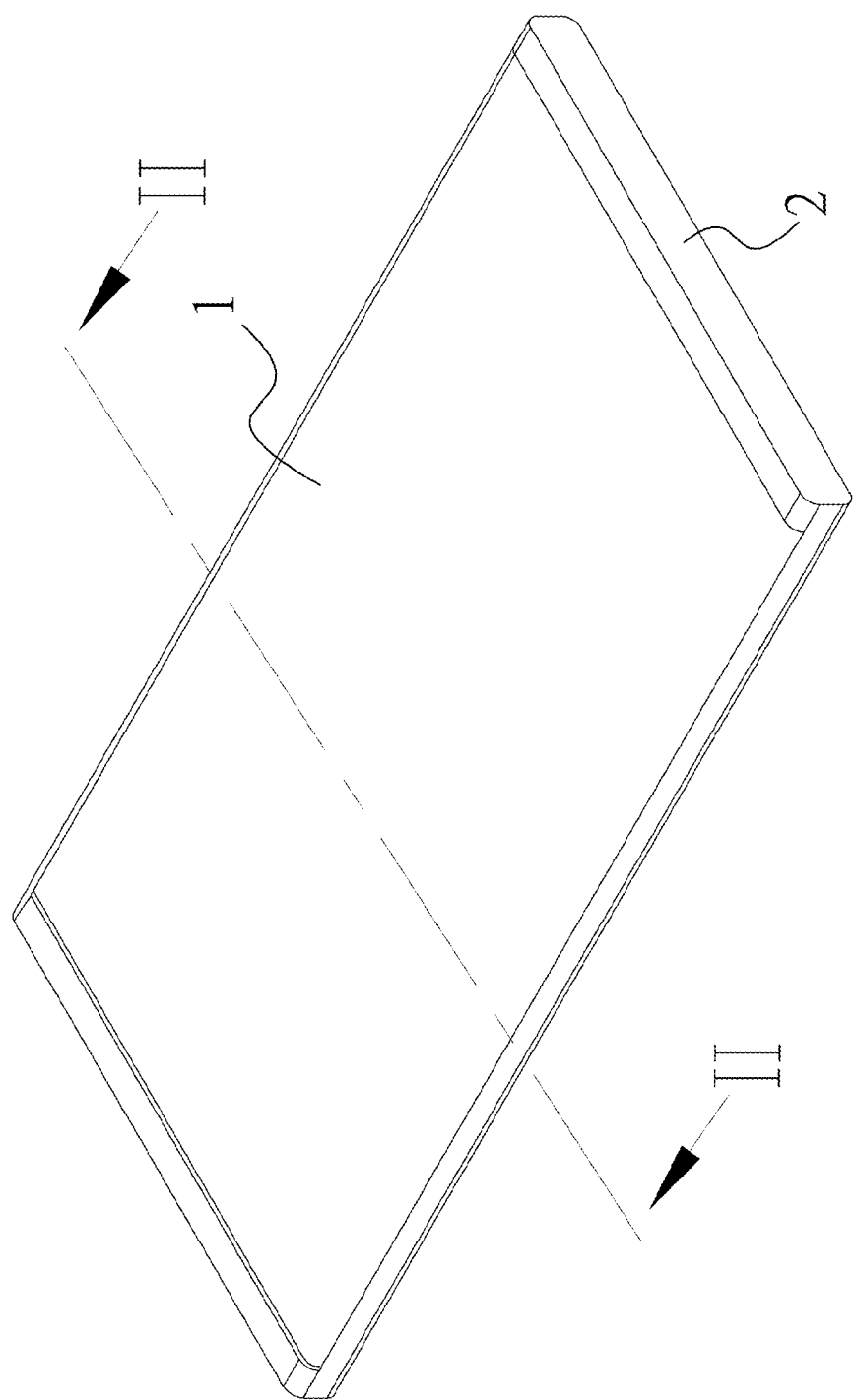
FIG. 1 is the schematic diagram of the invention in the first preferred embodiment, illustrating the connection between the thermal conductive body and thermal insulation layer.
Figure 9:
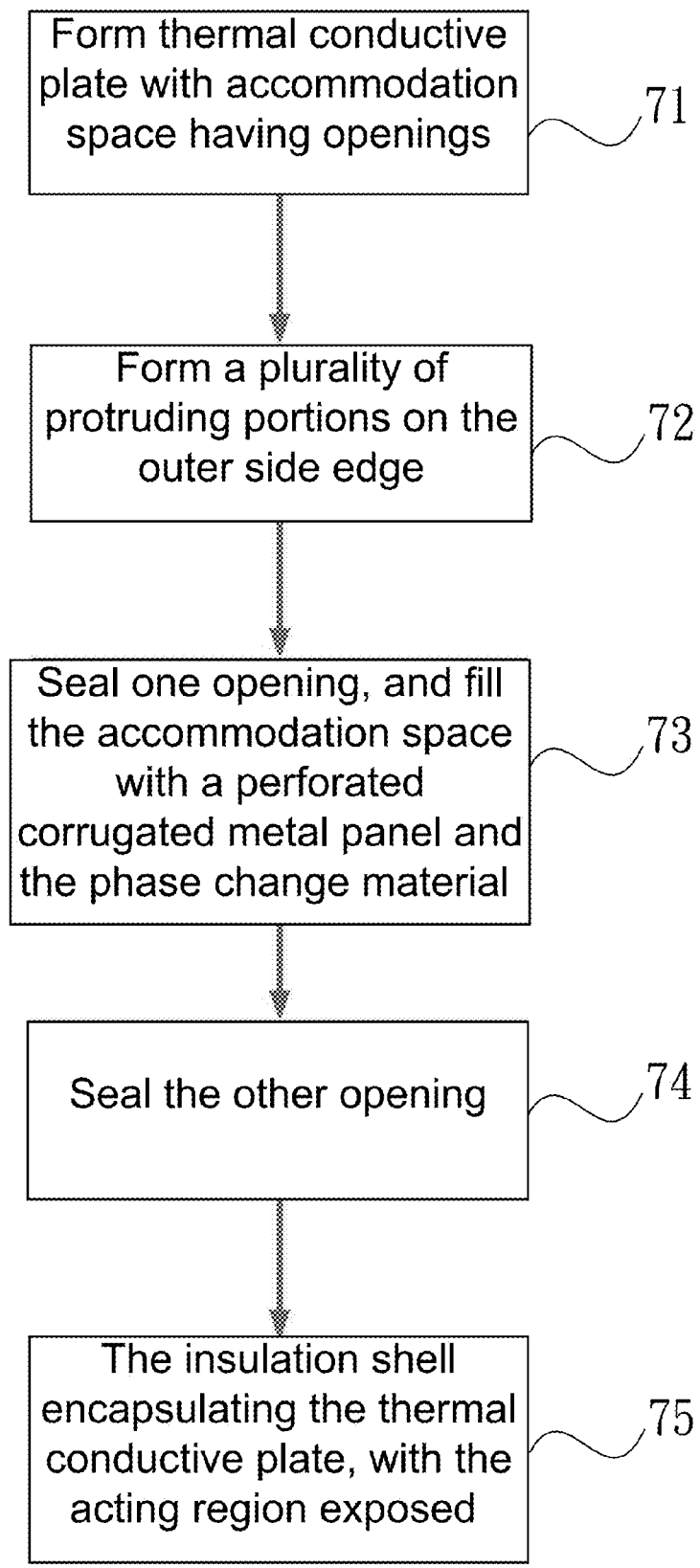
FIG. 9 is the flowchart of the production method in the invention.

The thermal exchange food processing device according to the first preferred embodiment of the invention is shown in FIGS. 1~4. The thermal exchange food processing device disclosed herein is a foodstuff board, mainly comprising a thermal conductive body 1 and a thermal insulation layer 2, as well as the phase change material 5 providing latent heat for temperature control. According to the manufacturing method shown in FIG. 9, a hollow thermal conductive body 1 having openings 15 at two opposite ends is initially formed in Step 71. In this embodiment, the thermal conductive body is tailored to extend along a single direction by an aluminum extrusion molding process. Taking advantage of the ductility of aluminum power, a thermal conductive body having a large surface area can be easily produced by extrusion molding. For example, with a 10-inch wide mold, aluminum powder can be easily extrusion molded into a hollow thermal conductive body having a length of 15 inches, 17 inches or even 30 inches, which is in turn cut into a desired length to meet the market demand. For the purpose of clarity and illustration, the direction extending from upper left to lower right in FIG. 1 is designated as the length direction and the direction from lower left to upper right is designated as the width direction.

Figure 2:
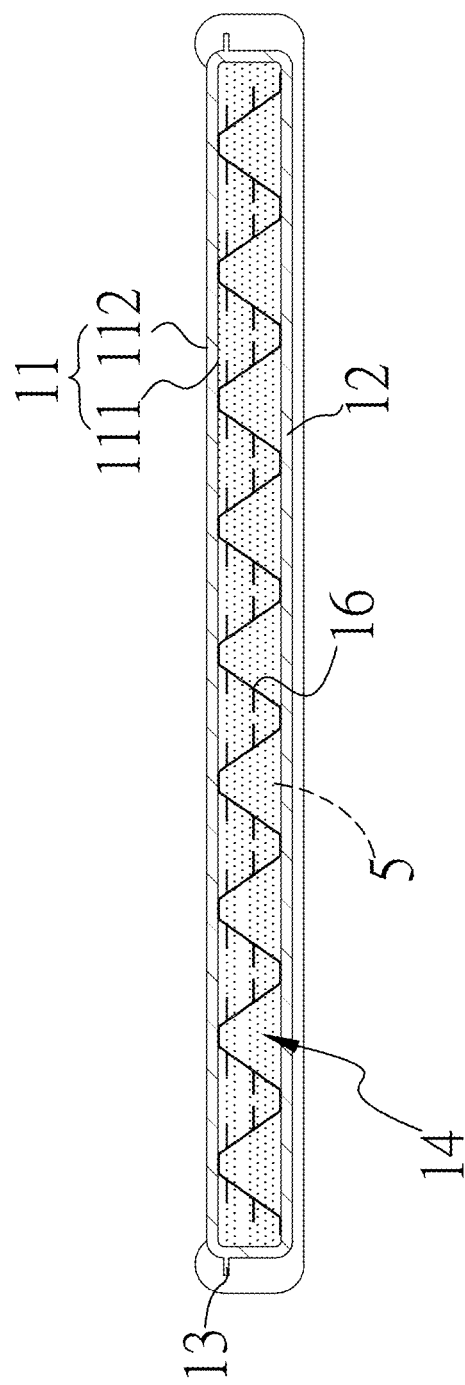
FIG. 2 is the sectional view of the invention in the first preferred embodiment, illustrating the phase change material in the accommodation space.
Figure 3:
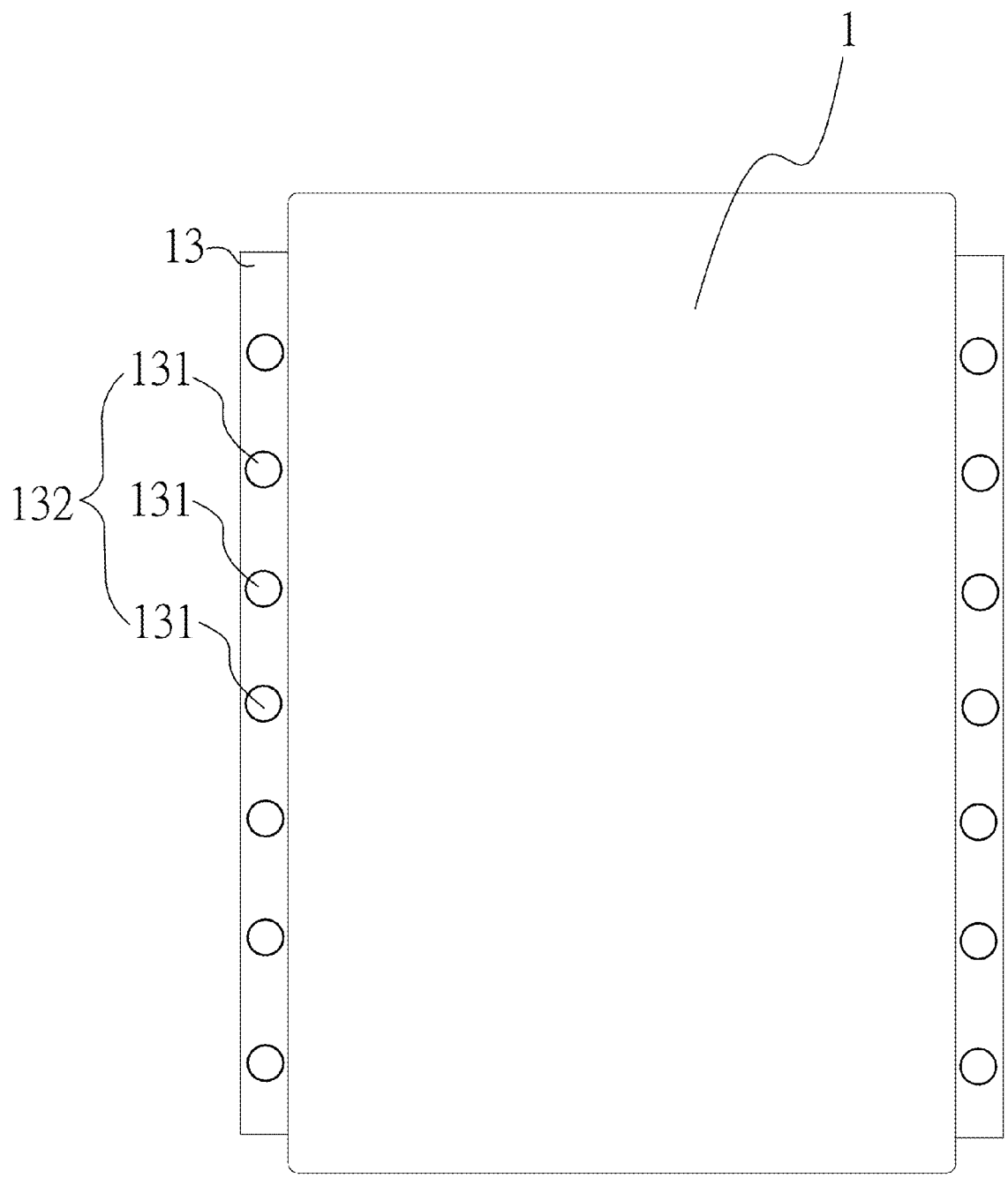
FIG. 3 is the diagram of the partial structure of the invention in the first preferred embodiment, illustrating the situation of positioning holes and anchor ports of the outer flange.

For the purpose of clarity and illustration, the top plate of the thermal conductive body 1 shown in FIG. 2 is denoted as the thermal exchange acting wall 11, and the bottom plate opposite to the thermal exchange acting wall 11 is denoted as the bottom wall 12 of the thermal conductive body 1. An accommodation space 14 is thus defined between the thermal exchange acting wall 11 and the bottom wall 12. In this embodiment, the thermal conductive body 11 includes an inner thermal conductive region 111 which is illustrated as the inner surface of the inner thermal conductive region 11 facing the accommodation space 14, whereas the acting region 112 is the outer surface of the thermal exchange acting wall 11 exposed outside. Two outer flanges 13 are extended from the thermal exchange acting wall 11 along the width direction. In Step 72, anchor ports 132 with a plurality of positioning holes 131 are formed on the outer flanges 13 by stamping. As shown in FIG. 3, the anchor ports 132 are fixed to the thermal insulation layer through the positioning holes 131. The thermal conductive body is the media for heat exchange, thus, it could be substituted by other metal conductive plates with a high conductivity coefficient, such as copper plates and aluminum plates, so as to provide good and stable thermal exchange efficiency.

Figure 4:
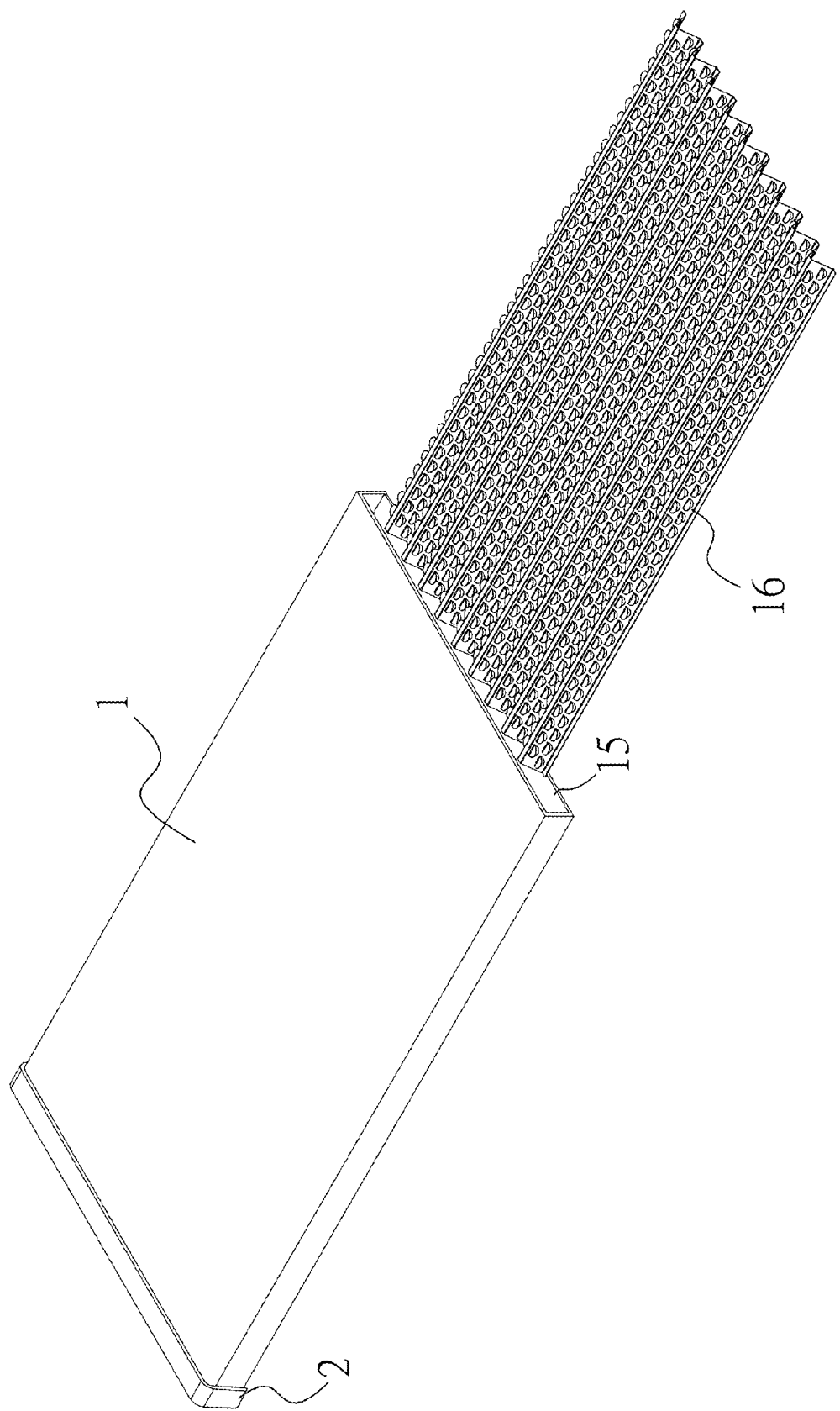
FIG. 4 is the schematic diagram of the invention in the first preferred embodiment, illustrating the situation of the perforated corrugated metal panel disposed in the accommodation space.

Next, in Step 73 shown in FIG. 4, the opening 15 of the thermal conductive body 1 shown in the upper left side of the Figure is sealed, and the accommodation space 14 is then inserted with a piece of corrugated metal panel formed with multiple perforations, which is therefore called perforated corrugated metal panel 16. Besides, the perforated corrugated metal panel 16 may be substituted by other material capable of improving thermal conductivity, such as metal mesh fabrics or plastic fabrics added with graphite.

Then, the accommodation space 14 is filled with a phase change material 5 through the opening 15. In this embodiment, the phase change material 5 is paraffin particles in solid state, which is filled in the accommodation space 14 until it is thermally connected to the inner thermal conductive region 111. In Step 74, the opening 15 at the lower right side is sealed. From then on, the phase exchange material 5 is taken as a temperature control source that acts to absorb or release heat for food processing. It is apparent to those skilled in the art that the paraffin particles illustrated herein can be substituted by various organic or inorganic phase change materials, such as esters, polyols, crystalline hydrates, molten salts, aqueous solutions of salts, and a mixture thereof.

Finally, as shown in Step 75, a complete thermal insulation layer 2 is formed by injection molding, so that the bottom wall 12 and the outer flanges 13 of the thermal conductive body 1 are insulatively covered by the thermal insulation layer, with the acting region 112 being exposed outside and serving as an acting region for receiving and processing foodstuff. The outer flanges 13 are formed with a plurality of positioning holes 131, so that the thermal-resistant plastics used in the injection molding process would flow into the positioning holes 131. After cooling, the cured thermal insulation layer 2 is meshed and tightly engaged with the thermal conductive body 1 and sealed the openings 15 to a greater extent. The thermal exchange food processing device disclosed herein is produced accordingly.

The thermal insulation layer 2 may include an additional thermal insulation film made from different materials (not shown), thereby increasing the thermal insulation effect. It should be noted that Step 72 and Step 75 in this embodiment are interchangeable. In other words, the formation of the thermal insulation layer can be carried out prior to the filling of the phase change material and the sealing of openings.

Figure 5:
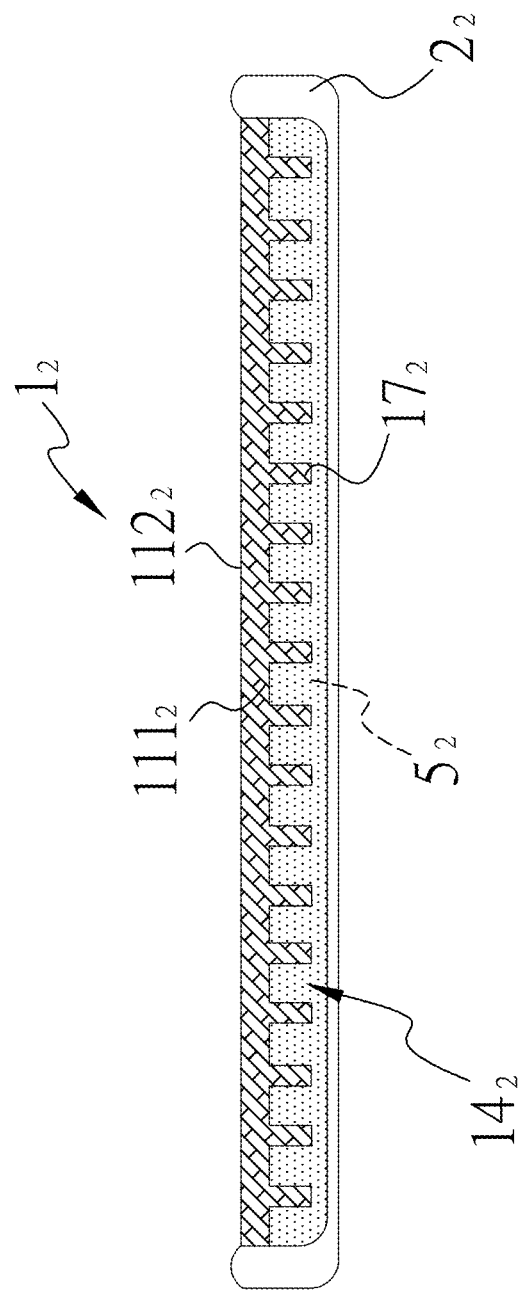
FIG. 5 is the sectional view of the invention in the second preferred embodiment, illustrating the structure of the downward fin portions.

Of course, the metal conductive plate used for the thermal conductive body according to the embodiment above can also be replaced by a ceramic plate with high thermal conductivity. FIG. 5 is the sectional view of the thermal exchange food processing device according to the second preferred embodiment of the invention. Different from the first preferred embodiment, the second preferred embodiment described herein uses the ceramic plate as the thermal conductive body $1_2$. Moreover, a plurality of downward fin portions $17_2$ extend downwardly from the lower side of the inner thermal conductive region $111_2$ opposite to the thermal exchange acting wall $112_2$. The downward fin portions $17_2$ may extend to the accommodation space $14_2$ to increase the thermal exchange surface area between the thermal conductive body $1_2$ and the phase change material $5_2$ in the accommodation space $14_2$, thereby improving the thermal exchange efficiency for food processing. Moreover, the downward fin portions $17_2$ may further serve as a support frame. When the user applies force on the acting region $112_2$, such as stirring a juice solution on the acting region $112_2$ with a turner, or pressing the foodstuff with tableware, the force can be countered by the integrally formed downward fin portions $17_2$, so as to avoid deformation or damage of the thermal conductive body $1_2$ and increase the reliability of the device. In addition, the accommodation space $14_2$ is defined by the thermal conductive body $1_2$ together with the thermal insulation layer $2_2$.

This embodiment is for processing the ice treats and, therefore, an aqueous solution of table salt is filled within the accommodation space $14_2$ to serve as the phase change material $5_2$. In the case of preparing smoothies, the device is cooled in a freezer for a period of time to transform the aqueous solution into ice at −20. Then a liquid juice is poured on the acting region of the thermal exchange food processing device and stirred with a turner, so that the phase change material absorbs the heat of the liquid juice continuously to solidify the liquid juice. The device disclosed herein allows the user to make ice treats in an extremely simple way and further greatly prolongs the frozen period of the ice treats once it is made. Thus, the consumers don't have to concern with the problems of immediate melting of the ice treats. Moreover, the thermal exchange food processing device disclosed herein is of a simple structure, which is not equipped with complicated electronic parts for heat dissipation. It is cost effective to manufacture and highly durable. Especially, since it is easy-to-operate, people could learn to use it very quickly. Besides, the phase change material inside is paraffin or an aqueous solution of table salt which is safe and non-poisonous. Even if the shell is cracked or broken, it will not pose high risks.

In addition to being applied for preparing smoothies, the device can also serve as a stable heat source for warming foodstuff by using a phase change material that releases heat continuously, such as paraffin having a melting point of 60. For example, when the device is applied in a common steakhouse, the steak may be put on the device and serve to the consumer. The phase change material inside can keep the steak warm. In this way, it could maintain the temperature of steak longer than by just merely relying on the heat remaining in the dish, making the consumer enjoy the best taste of the food. It is a piece of good news especially for those who like eating slowly, because they could enjoy the food slowly without worrying about the original flavor being lost once the food cools down. Moreover, the device disclosed herein makes the steakhouse more competitive in the market.

Figure 6:
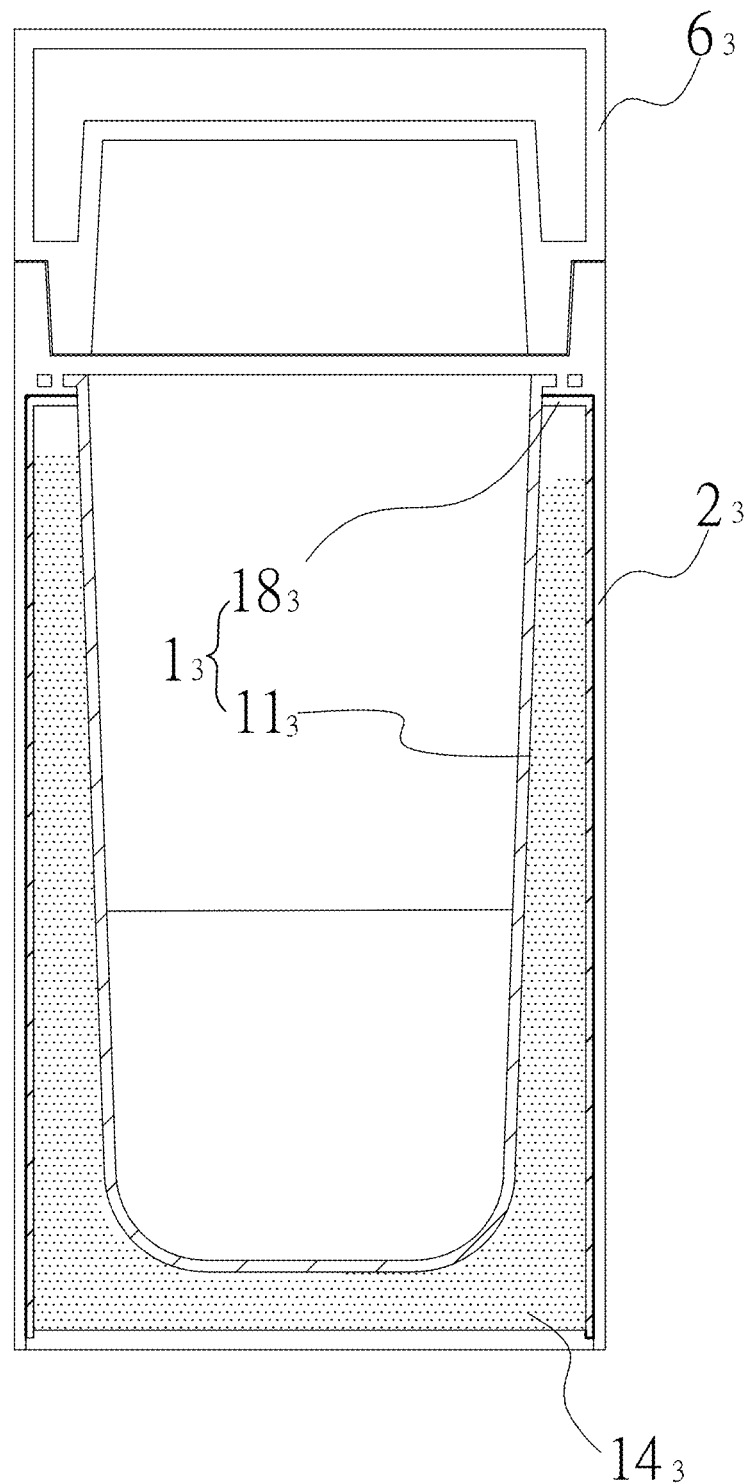
FIG. 6 is the perspective diagram of the invention in the third preferred embodiment, illustrating the situation of the technology of this case applied in the structure of thermos.
Figure 7:
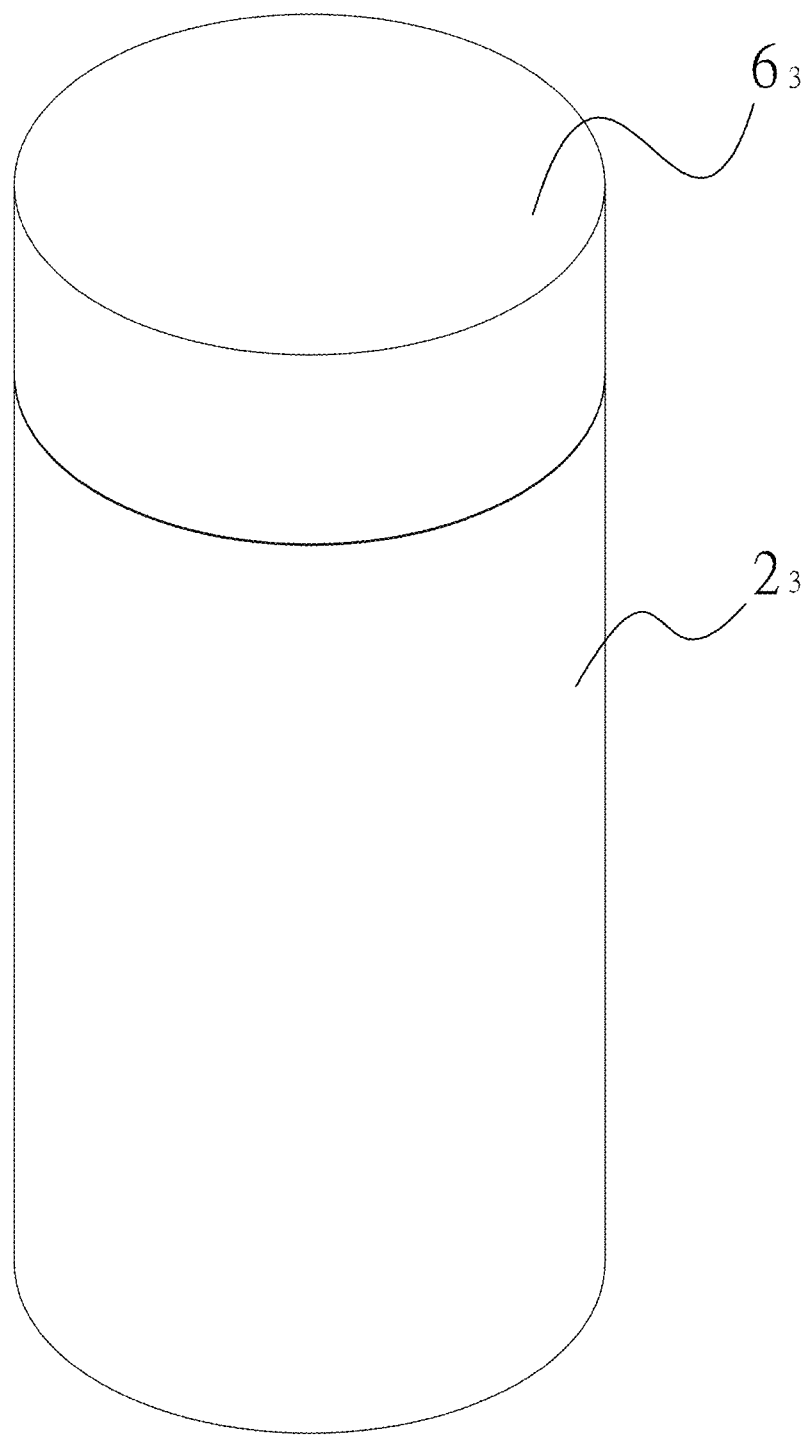
FIG. 7 is the schematic diagram of the invention in the third preferred embodiment.

The third preferred embodiment of the invention is shown in FIGS. 6 and 7. The thermal exchange food processing device disclosed herein is in the form of a thermos bottle, comprising an insulated cover $6_3$ axially combining with the thermal insulation layer $2_3$. The thermal conductive body $1_3$ is fabricated to include a thermal exchange acting wall $11_3$, which is a metal plate formed by drawing and having a central recessed area, rather than the planar structure disclosed in the embodiments above. A surrounding wall $18_3$ integrally extending from the thermal exchange acting wall $11_3$ defines an accommodation space $14_3$ together with the thermal exchange acting wall $11_3$. The thermal insulation layer $2_3$ is illustrated as a cup body encapsulating the surrounding wall $18_3$ from the outside. The insulated cover $6_3$ is illustrated as a cup cover which, when combined with the cup body, can effectively block the thermal exchange with the outside. In this way, the inner heat could be fully utilized.

Similarly, when it is applied to the iced drink, the device is put in a freezer for a period of time before pouring the drink into it. The phase change material in solid phase absorbs the heat in the drink and transforms into liquid phase, so that the drink is cooled. The user could even shake the thermal exchange food processing device to have the heat in the drink be absorbed by the device, thereby producing a smoothie rapidly.

Figure 8:
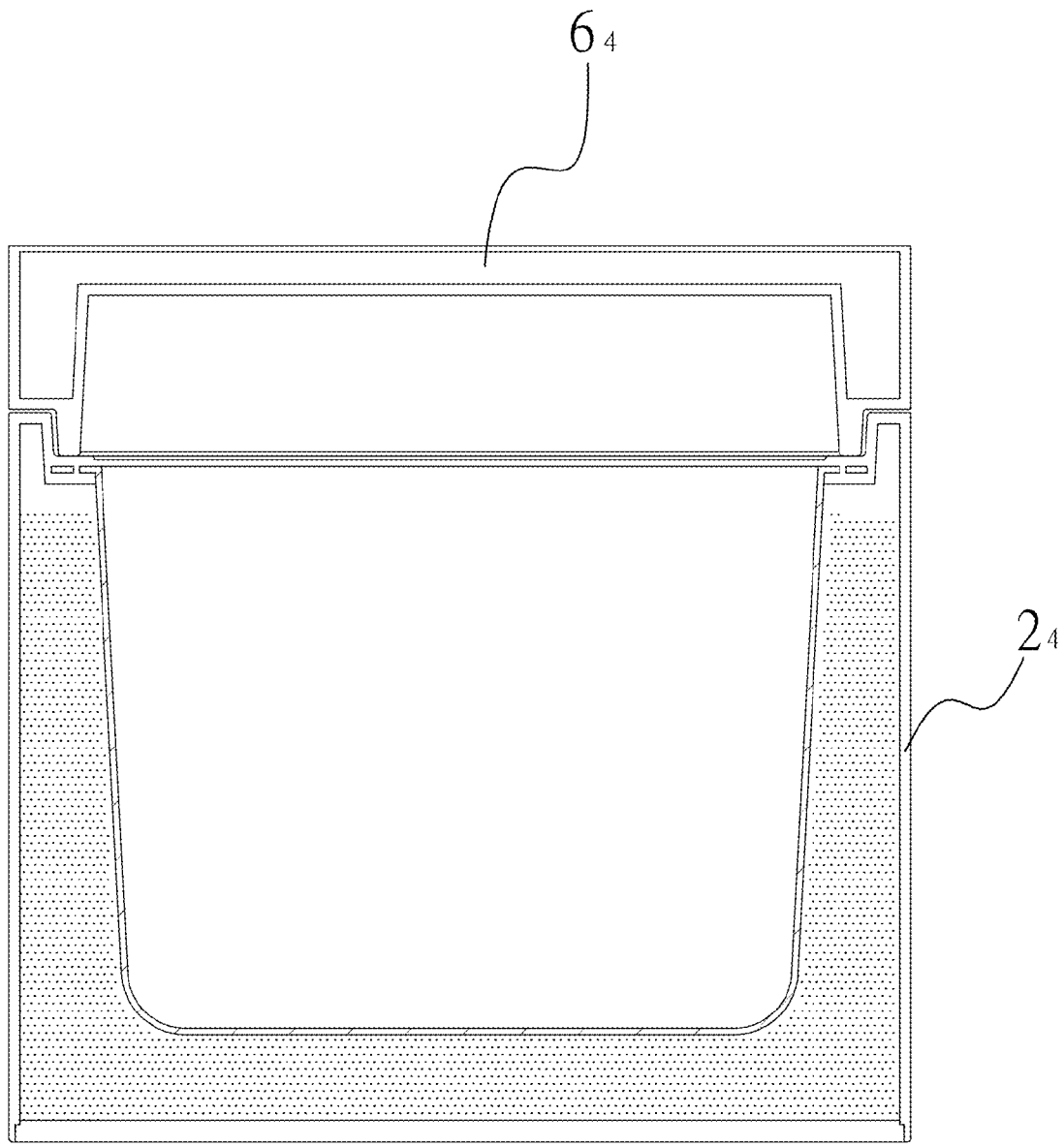
FIG. 8 is the perspective diagram of the invention in the fourth preferred embodiment, illustrating the situation of the technology of this case applied in the structure of the thermal box.

The structural design of the thermal exchange food processing device may vary depending on the sizes of the food items to be processed. According to the fourth preferred embodiment of the invention shown in FIG. 8, the thermal insulation layer $2_4$ and the insulated cover $6_4$ are tailored in rectangular shape. It can be used as thermal insulated containers for storing variety of food items, which are not restricted to the liquid items stated in the above embodiments. When storing fresh food items, such as vegetables and fruits, it could keep them fresh under low temperatures for a long time. In this way, it prevents food from being spoiled or becoming a breeding ground for bacteria, and further increases the usage of the invention.

Figure 10:
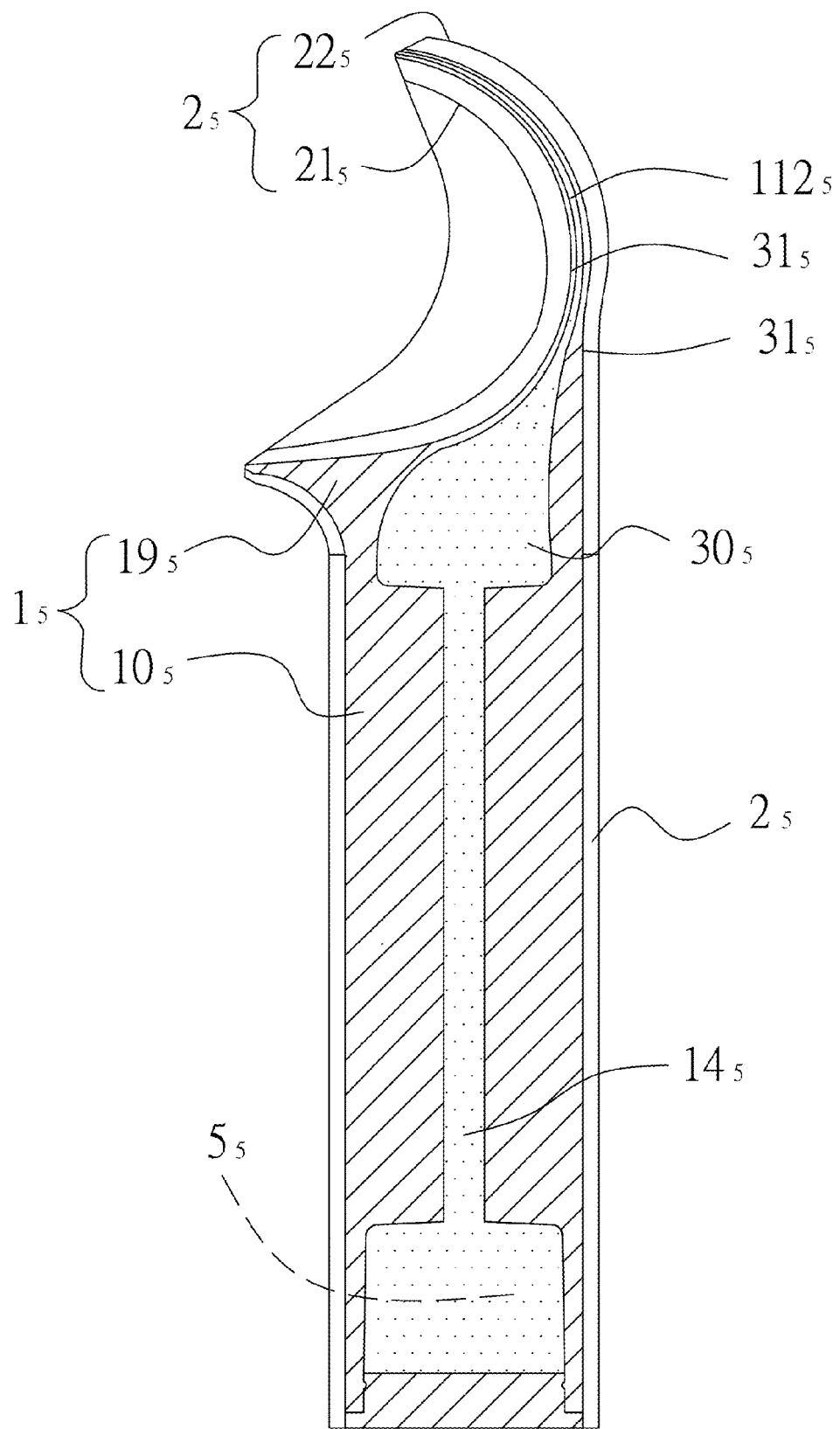
FIG. 10 is the vertical sectional view of the invention in the fifth preferred embodiment, illustrating the situation of the technology of this case applied in an ice cream scoop.

The invention can be also used for local temperature control. For example, when a frozen food item which may soften or liquefy under ambient temperature, such as butter or ice cream, is to be processed, it may require applying heat to a limited region to help cut or scoop a part of the frozen food item, while avoiding melting of the entire frozen food item. As shown in FIG. 10, the thermal exchange food processing device according to the fifth preferred embodiment of the invention is an ice cream scoop, which comprises a thermal conductive body $1_5$ and a thermal insulation layer $2_5$ encapsulating at least in part the thermal conductive body $1_5$. The thermal conductive body $1_5$ is a scoop-shaped thermal conductive metal comprising a hollow handle portion $10_5$ and a processing portion $19_5$. The hollow handle portion $10_5$ is a generally cylindrical-shaped metal handle covered by the thermal insulation layer $2_5$. For the purpose of clarity and illustration, the axial direction in which the handle extends is defined as the longitudinal direction.

A processing portion $19_5$ extending from the front end of the thermal conductive body $1_5$ is a scoop which may serve to take ice cream. The processing portion $19_5$ is integrally formed with the thermal conductive body $1_5$ by aluminum casting and includes two side surface portions $31_5$, namely the concave portion and convex portion, both being coated with the thermal insulation layer $2_5$ having a lower thermal conductivity coefficient compared with the thermal conductive body $1_5$. For the purpose of illustration, the thermal insulation layer $2_5$ in the concave portion is called scoop inner wall $21_5$, while the thermal insulation layer $2_5$ in the convex portion is called scoop outer wall $22_5$. The side edge of the scoop connecting the scoop inner wall $21_5$ and the scoop outer wall $22_5$ is the acting region $112_5$ not covered by the thermal insulation layer $2_5$. The exposed acting region $112_5$ has a high conductivity coefficient and constitutes a part of the thermal conductive body $1_5$ and is adapted for thermal connection with ice cream.

Figure 11:
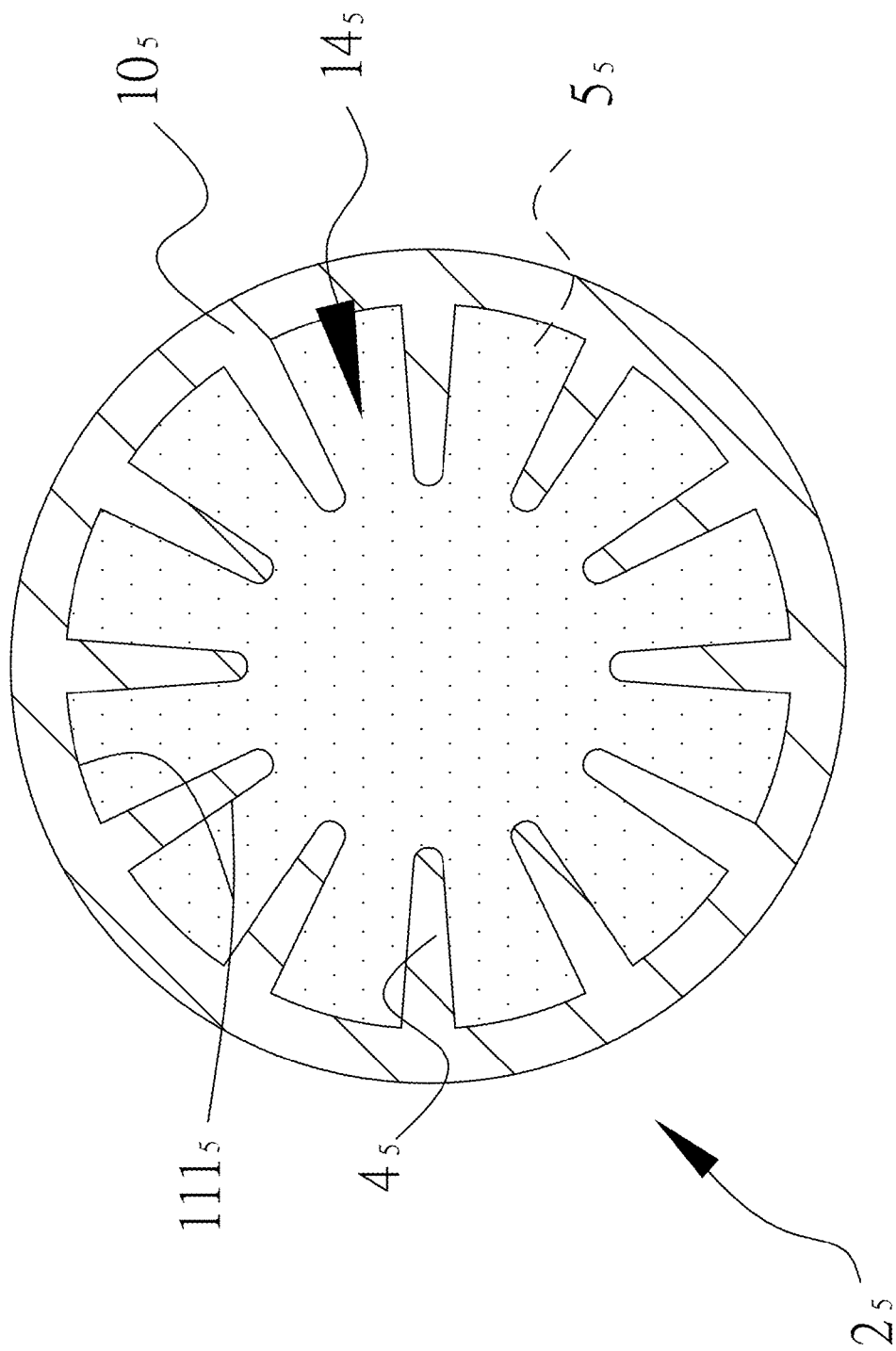
FIG. 11 is the transverse sectional view of the invention in the fifth preferred embodiment, illustrating the interaction among the hollow accommodation space, phase change material and the heat sink fins in the ice cream scoop.

As shown in FIG. 11, the cylindrical chamber of the hollow handle portion $10_5$ includes an inner thermal conductive region $111_5$ surrounding an accommodation space $14_5$ along the longitudinal direction. The accommodation space $14_5$ is filled with phase change material $5_5$. In this embodiment, the phase change material $5_5$ is distilled water thermally connected with the inner thermal conductive region $111_5$. Moreover, in the processing portion $19_5$, the inner thermal conductive region $111_5$ is formed with a gap $30_5$ connecting to the accommodation space $14_5$, so that distilled water could flow into it. A plurality of heat sink fins $4_5$ extending from the hollow handle portion $10_5$ into the accommodation space $14_5$ are integrally formed with the thermal conductive body $1_5$, so as to effectively increase the thermal exchange area between distilled water and the thermal conductive body $1_5$.

When the user uses the thermal exchange food processing device disclosed herein to scoop some ice cream, the scoop inner wall $21_5$, scoop outer wall $22_5$ and acting region $112_5$ of the ice cream scoop at room temperature are brought in contact with the frozen ice cream. Since the scoop inner wall $21_5$ and scoop outer wall $22_5$ have low thermal conductivity, the acting region $112_5$ is the only portion to conduct thermal exchange with the ice cream. The acting region $112_5$ will transfer the heat stored in the processing portion $19_5$ and the thermal conductive body $1_5$ to the ice cream, so as to slightly soften the ice cream. However, due to the low thermal capacity of aluminum, the metal portion of the ice cream scoop will be cooled instantly. Then, distilled water in the gap $30_5$ of the processing portion $19_5$ and the accommodation space $14_5$ of the hollow handle portion $10_5$ will further provide heat to the inner thermal conductive region $111_5$. The heat will be transferred from the inner thermal conductive region $111_5$ to the acting region $112_5$. In this way, the acting region $112_5$ could continue to conduct thermal exchange with the frozen foodstuff $112_5$, so as to slightly melt the solid frozen foodstuff for scooping.

When the ice cream scoop is used by many people continuously, the phase change material, namely distilled water, will be gradually cooled down to 0. At this time, as affected by the ice cream below 0, distilled water will undergo a phase change from liquid water to solid ice at 0. Through this phase change, the phase change material can release latent heat which is in turn delivered to the acting region $112_5$ of the processing portion $19_5$, and then to the position for scooping the ice cream. Therefore, with the heat from the metal portion and distilled water and the heat released from the phase change of distilled water, the ice cream contacting the acting region $112_5$ will thaw easily for cutting or scooping.

The outer side of the hollow handle portion $10_5$ of the thermal conductive body $1_5$ may also be covered by the thermal insulation layer $2_5$. Therefore, even if the metal portion and distilled water are cooled down to 0, or even during the phase change process, the heat on the user's hand will not be significantly absorbed by the device and will not make the user feel uncomfortable. In the meantime, the processing portion $19_5$ covered by the thermal insulation layer $2_5$ will only slightly melt the target part of the ice cream, but will not affect the remaining parts. In this way, it keeps the food item at a frozen state. When taken out from the freezer, the food item will not be melted quickly due to absorbing large amounts of heat from the ice cream scoop.

Therefore, when the user scoops ice cream with the thermal exchange food processing device disclosed herein, it will be very easy to operate on one hand, and the user could get a complete scoop of ice cream rather than some melted cream in liquid state, on the other hand. In particular, it protects the ice cream remaining in the bucket from melting due to the temperature of the ice cream scoop. Moreover, the user's hand will not be chilled due to the low temperature of the ice cream. After using, the user just need to place the thermal exchange food processing device in ambient temperature, allowing it to absorb heat from the ambient air to conduct thermal exchange with the thermal conductive body, scoop portion and the heat sink fins. Furthermore, the distilled water would undergo a phase change from solid to liquid, through which it will achieve the effect of absorbing/releasing heat without a power supply, so as to save energy effectively.

Figure 12:
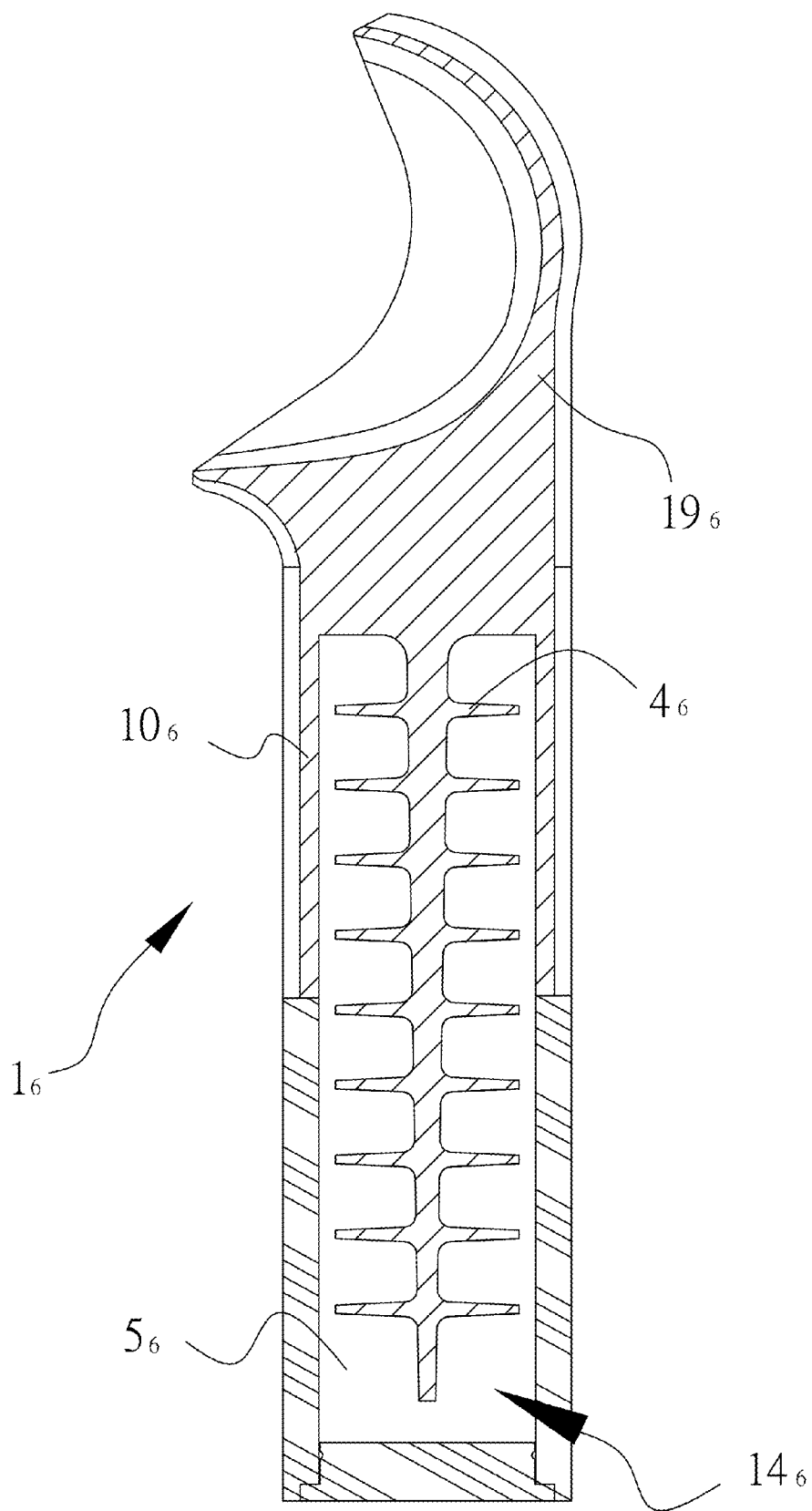
FIG. 12 is the vertical sectional view of the invention in the sixth preferred embodiment, illustrating the structure of the hollow handle portion.

The sixth preferred embodiment of the invention is shown in FIG. 12, wherein the phase change material $5_6$ is distilled water. In this embodiment, the heat sink fins $4_6$ extend from the processing portion $19_6$ into the accommodation space $14_6$. When the thermal conductive body $1_6$ of the thermal exchange food processing device is brought in contact with the ice cream, the heat sink fins $4_6$ will transfer heat from the ice cream to the distilled water. Through the simple phase change of the distilled water, the invention applies heat to slightly melt a part of the ice cream for scooping. In addition, the lower half of the hollow handle portion $10_6$ is made of metal and integrally formed with the processing portion $19_6$, and the upper half thereof is med of transparent plastic material. On one hand, the user's hand would provide some heat for melting the ice cream that is in contact with the acting region. On the other hand, the upper half of the hollow handle portion $10_6$ allows the user to watch the phase change process of the phase change material $5_6$ filled in the accommodation space $14_6$.

Figure 13:
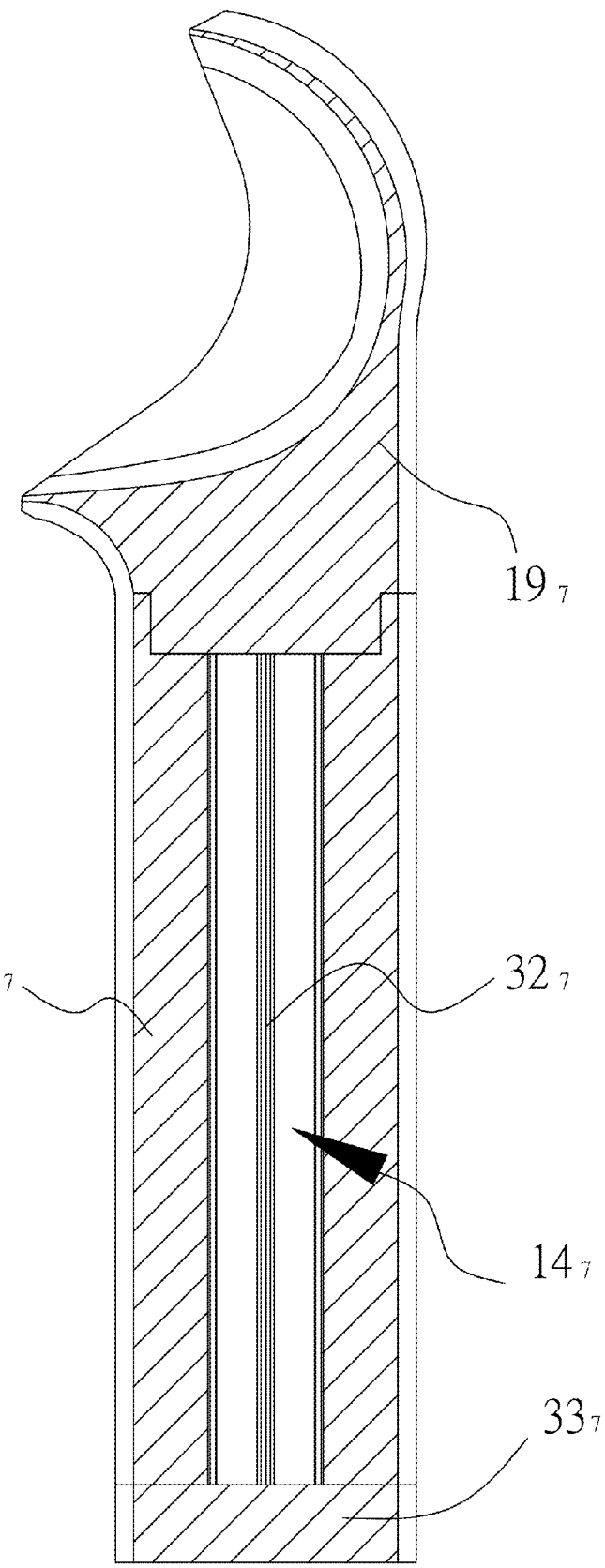
FIG. 13 is the vertical sectional view of the invention in the seventh preferred embodiment, illustrating the situation of the hollow handle portion formed with sealed ends on both ends.

The seventh preferred embodiment of the invention is shown in FIG. 13. One of the two opposite ends of the hollow handle portion $10_7$ is a sealed end $33_7$. A heat pipe $32_7$ is disposed in the accommodation space $14_7$ and connects the processing portion $19_7$ to the sealed end $33_7$. During the manufacture of the device disclosed herein, the pressure of the accommodation space is reduced, and the accommodation space is filled with the phase change material. The liquid phase fluid (not denoted with numeral) in the heat pipe will change into vapor phase at room temperature and low pressure. Moreover, the low pressure environment in the chamber will make the vapor (not denoted with numeral) fill up the chamber. When the ice cream absorbs heat, the vapor is cooled to liquid and then flows to the sealed end $33_7$ due to the vacuum and capillary effect. After that, the liquid will absorb heat from the sealed end $33_7$ and then return to its vapor state. The continuous cycle of liquid-vapor phase change achieves the purpose of softening the ice cream to be scooped. In this embodiment, a low-temperature fluid having the working temperature ranging from −70° C.~−200° C. is employed, and the preferred is water, methanol, ethanol and acetone.

Figure 14:
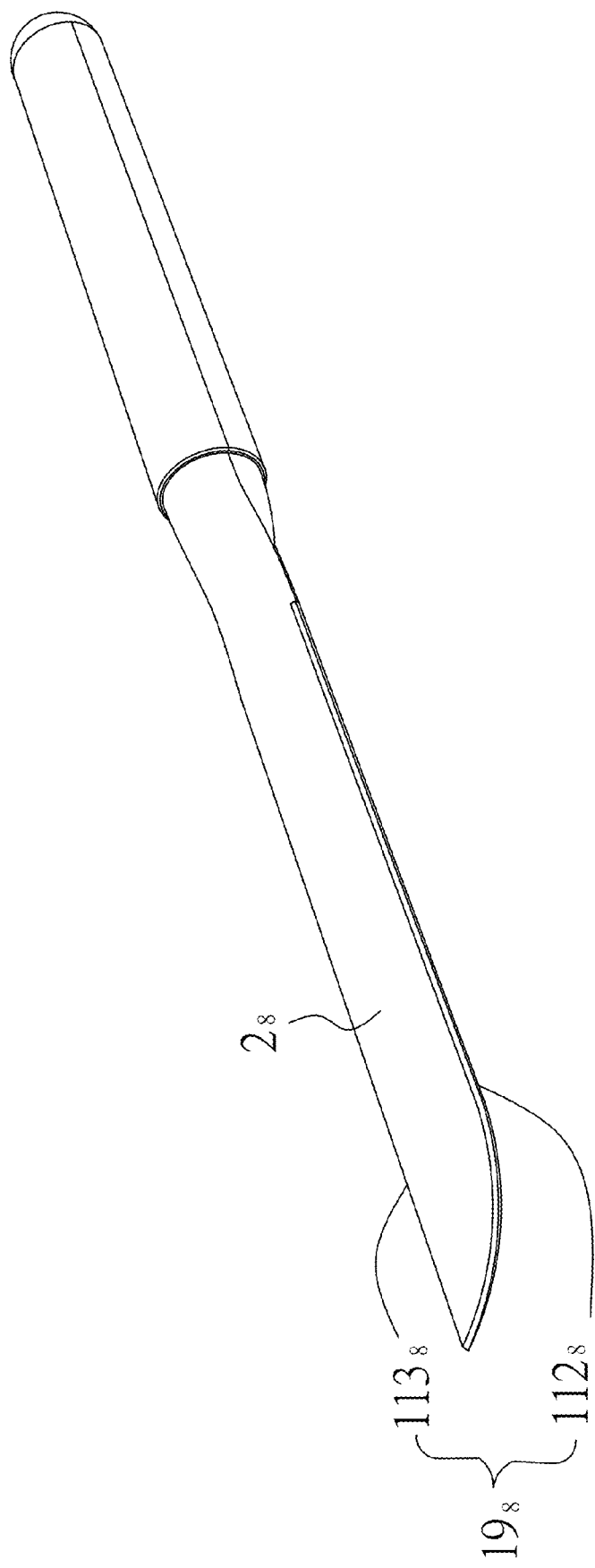
FIG. 14 is the schematic diagram of the invention in the eighth preferred embodiment, illustrating the situation of the technology of this case applied in the butter knife.
Figure 15:
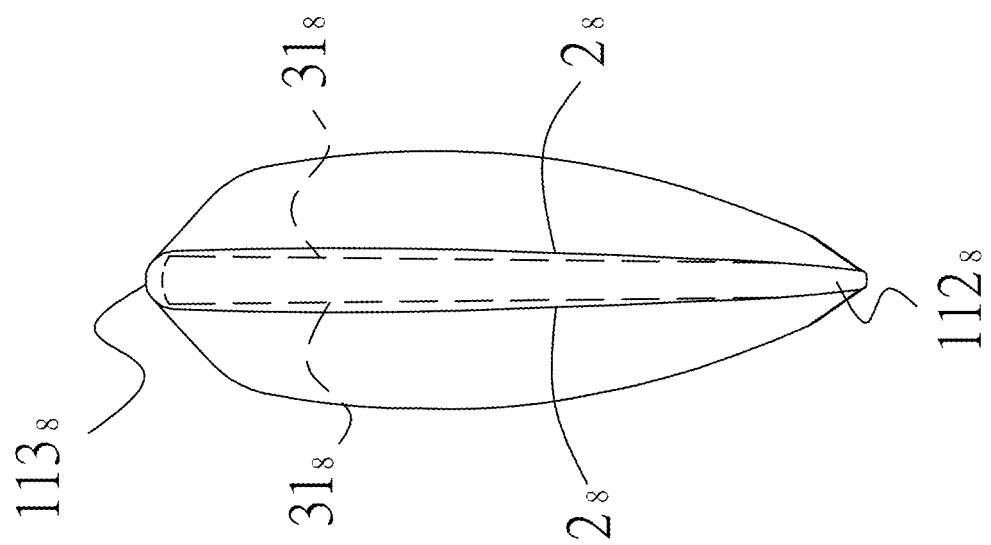
FIG. 15 is the front view of the invention in the eighth preferred embodiment, illustrating the situation of the thermal insulation layer encapsulating two side surfaces.

In the eighth preferred embodiment of the invention, the solid frozen foodstuff is a frozen butter block (not shown) stored under low temperature, and the thermal exchange food processing device is illustrated as a butter knife. As shown in FIGS. 14 and 15, the processing portion $19_8$ is a knife portion comprising two side surfaces covered by the thermal insulation layer $2_8$, an acting region $112_8$ connected to the two side surfaces $31_8$ and configured in the form of a knife blade portion, and a knife back portion $113_8$ having a greater thickness compared with the knife blade portion.

The acting region $112_8$ in the form of a knife blade portion has a small area for applying stress. The force applied by the user will be concentrated along the blade due to the shape and structure of the acting region $112_8$. When the acting region $112_8$ is pressed on the butter, it will easily slice a piece of butter. The side surfaces $31_8$ are covered by the thermal insulation layer, so that they will not release heat to further melt the butter remaining on the side surfaces $31_8$ after cutting. The user could also easily spread the cut butter on a toast slice.

The thermal exchange food processing device of the invention is applicable in food processing which requires local temperature control, such as the solid frozen foodstuff. Whether the invention is fabricated in the form of a butter knife or an ice cream scoop, it could easily cut and separate the clotted butter or ice cream, increasing the convenience in use. In addition, by virtue of the thermal insulation layer, the invention is adapted to prevent the solid frozen foodstuff from liquefying on the thermal exchange food processing device directly. Thus, the user could spread the butter or eat the ice cream more easily or neatly. Even if the structure of the thermal exchange food processing device is damaged accidentally, causing the leakage of the phase change material, there is no occurrence of contamination in the foodstuff because the invention uses distilled water as the phase change material in the fifth-eighth embodiments. Moreover, distilled water is cheap and easily available, which reduces the manufacturing cost. The invention achieving all the above purposes accordingly.

While the invention has been described with reference to the preferred embodiments above, it should be recognized that the preferred embodiments are given for the purpose of illustration only and are not intended to limit the scope of the present invention, and various modifications as well as changes, which will be apparent to those skilled in the relevant art, may be made without departing from the spirit and scope of the invention.

What is claimed is:

1. A thermal exchange food processing device for processing at least one target foodstuff, comprising:
    a thermal conductive body comprising an acting region adapted for being in contact with and exchanging heat with the at least one target foodstuff and at least one inner thermal conductive region disposed corresponding to, and in thermal connection with, the acting region;
    a thermal insulation layer having a lower thermal conductivity coefficient than the thermal conductive body and encapsulating at least a portion of the thermal conductive body, so that the acting region of the thermal conductive body is exposed while remaining regions of the thermal conductive body other than the acting region are thermally insulated from the ambient environment, wherein the thermal conductive body alone or together with the thermal insulation layer defines an accommodation space and the inner thermal conductive region is disposed to face the accommodation space; and a phase change material disposed within the accommodation space and in thermal connection to the inner thermal conductive region;

wherein the thermal conductive body further comprises:

a processing portion comprising two side surfaces covered completely by the thermal insulation layer, wherein the acting region is a side edge connected to the two side surfaces; and a hollow handle portion extending from the processing portion and formed with the accommodation space.

2. The thermal exchange food processing device according to claim 1, wherein the thermal conductive body comprises a thermal exchange acting wall having an outer surface and an inner surface opposite to the outer surface, and wherein the acting region is the outer surface and the inner thermal conductive region is the inner surface.

3. The thermal exchange food processing device according to claim 2, wherein the thermal conductive body further comprises a surrounding wall integrally extending from the thermal exchange acting wall and cooperating with the thermal exchange acting wall to define the accommodation space.

4. The thermal exchange food processing device according to claim 2, wherein the thermal conductive body further comprises an anchor port extending from a flange of the thermal exchange acting wall, the anchor port being formed with a plurality of positioning holes, through which the thermal insulation layer is combined with the thermal conductive body.

5. The thermal exchange food processing device according to claim 2, wherein the thermal conductive body is a ceramic plate.

6. The thermal exchange food processing device according to claim 5, wherein the ceramic plate comprises the thermal exchange acting wall and downward fin portions integrally extending from the inner thermal conductive region of the thermal exchange acting wall.

7. The thermal exchange food processing device according to claim 1, further comprising a perforated corrugated metal panel disposed in the accommodation space.

8. The thermal exchange food processing device according to claim 1, wherein the thermal insulation layer extends to and covers the hollow handle portion.

9. The thermal exchange food processing device according to claim 1, wherein the inner thermal conductive region comprises a plurality of heat sink fins integrally extending into the accommodation space from the processing portion.

10. The thermal exchange food processing device according to claim 1, further comprising at least one heat pipe disposed within the accommodation space of the hollow handle portion.

11. The thermal exchange food processing device according to claim 1, wherein the processing portion is a scoop portion and the thermal insulation layer comprises a scoop inner wall and a scoop outer wall spaced apart from each other and covering the two side surfaces, respectively.

12. The thermal exchange food processing device according to claim 1, wherein the processing portion is a knife portion, and the side edge connected to the two surfaces comprises a knife blade portion and a knife back portion having a greater thickness compared with the knife blade portion.

* * * * *

UNITED STATES PATENT AND TRADEMARK OFFICE
CERTIFICATE OF CORRECTION

PATENT NO. : 9,651,311 B2  
APPLICATION NO. : 14/099116  
DATED : May 16, 2017  
INVENTOR(S) : Jung-Ya Hsieh and Yung-Fu Lin Page 1 of 1

It is certified that error appears in the above-identified patent and that said Letters Patent is hereby corrected as shown below:

The Assignee should read:  
THAT Inventions Co., Taipei City, Taiwan

Signed and Sealed this  
Tenth Day of October, 2017

Joseph Matal  
*Performing the Functions and Duties of the*  
*Under Secretary of Commerce for Intellectual Property and*  
*Director of the United States Patent and Trademark Office*